United States Patent [19]

Tanaka et al.

[11] Patent Number: 4,813,507
[45] Date of Patent: Mar. 21, 1989

[54] AXLE BEAM INCLUDING A PROTECTING MEMBER

[75] Inventors: Hiroaki Tanaka, Toyota; Yutaka Inuzuka, Nishio; Hideki Takeo, Toyota, all of Japan

[73] Assignee: Toyota Jidosha Kabushiki Kaisha, Aichi, Japan

[21] Appl. No.: 129,900

[22] Filed: Dec. 7, 1987

Related U.S. Application Data

[63] Continuation of Ser. No. 784,550, Oct. 4, 1985, abandoned.

[30] Foreign Application Priority Data

Oct. 8, 1984 [JP] Japan ................................. 59-210992
Oct. 8, 1984 [JP] Japan ................................. 59-210993
Oct. 8, 1984 [JP] Japan ................................. 59-210994
Aug. 30, 1985 [JP] Japan ........................... 60-132897[U]

[51] Int. Cl.⁴ .............................................. B60B 35/00
[52] U.S. Cl. ..................................... 180/88; 172/508; 301/124 R
[58] Field of Search ................. 180/88, 69.1; 172/508, 172/572, 81; 280/152 R, 154.5 R, 157, 159, 160; 293/112, 138; 301/124 R

[56] References Cited

U.S. PATENT DOCUMENTS 4,534,440 8/1985 Sekizaki et al. ...................... 180/88

OTHER PUBLICATIONS

Research Disclosure, Dec. 1978, No. 176, p. 5, class 18/88.

Primary Examiner—David M. Mitchell
Assistant Examiner—Karin L. Ferriter
Attorney, Agent, or Firm—Oblon, Fisher, Spivak, McClelland, & Maier

[57] ABSTRACT

An axle beam for the rear wheel suspension of a front-engine front-wheel drive vehicle is disclosed. An axle beam body extends in the transverse direction of the vehicle with both ends thereof attached to wheel hubs, and trailing arms and springs connect the axle beam body to the vehicle body in the vicinity of the wheel hubs. An axle body protecting member having an inclined outer peripheral surface which inclines below the front side wall and extending in the transverse direction of the vehicle is attached to the front side wall of the axle beam body. The protecting member may be attached to the axle beam body through spacers, an elastic member or a universal joint.

13 Claims, 15 Drawing Sheets

AXLE BEAM INCLUDING A PROTECTING
MEMBER

This application is continuation of application Ser. No. 06/784,550, filed on Oct. 4, 1985, now abandoned.

BACKGROUND OF THE INVENTION

1. Field of the Invention

This invention relates to an axle beam of a rear wheel suspension for a front-engine front-wheel drive vehicle.

2. Description of the Prior Art

The rear wheel suspension of a conventional front-engine front-wheel drive vehicle is, as is shown in FIG. 1, composed of an axle beam 2 which is disposed between right and left brake drums 4 extending in the transverse direction of the vehicle, trailing arms 6 which are disposed between the axle beam and a vehicle body (not shown), and shock absorbers 8 with coiled springs.

The axle beam 2 has a U-shaped cross section as is shown in FIG. 2, such that its torsional rigidity has an appropriate value, and is disposed such that an opening portion 2A faces downward to prevent water, dust or the like from settling within the axle beam. The reference numeral 9 denotes a stabilizer extending into the axle beam 2 for reducing rolling of the vehicle body and increasing running stability. Two end portions of the stabilizer 9 are secured to end axles (not shown) which are attached to the axle beam 2.

A conventional axle beam 2 is disposed with the opening portion 2A facing downward, as is shown in FIGS. 1 and 2, and therefore the side walls 2B and 2C of the axle beam are perpendicular to the road surface. This structure has the following disadvantages. When the axle beam 2 comes into contact with a large obstacle 11 on the road, such as a large stone, a horizontal collisional force P with respect to the obstacle 11 acts directly on the axle beam 2, so that the side wall 2C is forced to bend, which leads to deformation of the axle beam and, sometimes, deformation of the stabilizer 9 provided within the axle beam 2.

SUMMARY OF THE INVENTION

Accordingly, it is an object of the present invention to provide an axle beam which is difficult to deform even when it comes into contact with an obstacle while the vehicle is running by attaching an axle beam body protecting member to an axle beam body, thereby solving the above-described problem in the prior art.

It is another object of the present invention to minimize any detrimental effect due to the torsional rigidity and the flexural rigidity of the axle beam on the stability of a vehicle during travelling, and its road-holding ability while running on a rough road, which is experienced by the attachment of the axle beam body protecting member.

To achieve this aim, this invention provides various axle beams according to various aspects of the present invention.

According to a first aspect of the present invention, an axle beam for the rear wheel suspension of a front-engine front-wheel drive vehicle is provided, composed of an axle beam body extending in the transverse direction of the vehicle with both ends thereof attached to wheel hubs, trailing arms, and springs which connect the axle beam body to the vehicle body in the vicinity of the wheel hubs, and which is characterized in that an axle beam body protecting member is attached to the front side wall of the axle beam body, the protecting member having an inclined outer peripheral surface which inclines below the front side wall and extending in the transverse direction of the vehicle.

According to a second aspect of the present invention, an axle beam of a rear wheel suspension of a front-engine front-wheel drive vehicle is provided, composed of an axle beam body extending in the transverse direction of the vehicle with both ends thereof attached to wheel hubs, trailing arms and springs which connect the axle beam body to the vehicle body in the vicinity of the wheel hubs, and which is characterized in that an axle beam body protecting member having an inclined outer peripheral surface which inclines below the front side wall and extending in the transverse direction of the vehicle is attached to the front side wall through spacers at a predetermined distance from the axle beam body.

According to a third aspect of the present invention, an axle beam of a rear wheel suspension of a front-engine front-wheel drive vehicle is provided, composed of an axle beam body extending in the transverse direction of the vehicle with both ends thereof attached to wheel hubs, and trailing arms and springs which connect the axle beam body to the vehicle body in the vicinity of the wheel hubs, and which is characterized in that an axle beam body protecting member having an inclined outer peripheral surface which inclines below the front side wall and extending in the transverse direction of the vehicle is attached to the front side wall through an elastic member.

According to a fourth aspect of the present invention, an axle beam of a rear wheel suspension of a front-engine front-wheel drive vehicle is provided, composed of an axle beam body extending in the transverse direction of the vehicle with both ends thereof attached to wheel hubs, trailing arms and springs of which connect the axle beam body to the vehicle body in the vicinity of the wheel hubs, and which is characterized in that an axle beam body protecting member having an inclined outer peripheral surface which is inclined below the front side wall and extending in the transverse direction of the vehicle is attached to the front side wall through an elastic member at a predetermined distance from the beam body, in that the body protecting member is secured to the beam body in the vicinity of the longitudinal ends of the protecting member, and in that at least one of securing members of the protecting member is composed of a universal joint.

The operation of the present invention will now be explained with reference to FIGS. 5(a), 5(b) and 5(c).

When an axle beam 21 comes into contact with the obstacle 11 on the road while the vehicle is running, the obstacle 11 first comes into contact with an inclined outer peripheral surface 24A of an axle beam body protecting member 24 (hereinunder referred to as simply "protecting member") which is attached to a front side wall 22C of an axle beam body 22 (hereinunder referred to simply as "beam body"). At this time, since the inclined outer peripheral surface 24A is inclined below the front side wall 22C, the protecting member 24 serves as a skid, and the beam body 22 and the protecting member 24 slide over the obstacle 11 as one unit and clear the obstacle 11, as is shown in FIGS. 5(b) and 5(c). As a result, the collisional force in the horizontal direction caused by contact with the obstacle 11 is reduced, so that deformation of the beam body 22 is prevented.

This axle beam is especially effective when a beam body has a cross section of, for example, an inverted U-shape, a U-shape, an L-shape, or a T-shape, since all of these configurations entail the risk of producing a large collisional force in the horizontal direction with respect to the front side wall of the beam body when the axle beam comes into contact with an obstacle on the road.

Sliding of the protecting member over an obstacle is further ensured by making the configuration of the protecting member such that a lower side edge portion thereof continuing from the inclined outer peripheral surface extendes under the front side wall of the beam body, and also that the lower side edge portion extends under a rear side wall of the beam body. In addition, if the lower side edge portion extends under the rear side wall so that the forward end portion thereof projects rearward, and the projecting portion is bent upward, thereby forming inclined peripheral surfaces both on the front and rear sides such that, deformation of the axle beam is prevented during reverse running as well as forward running.

The attachment of the protecting member 24 to the beam body 22 increases the torsional rigidity and flexural rigidity thereof, but these effects are suppressed as much as possible by disposing the protecting member 24 away from the beam body 22, by inserting an elastic member 230 between the beam body 22 and the protecting member 24, as is shown in FIGS. 21 and 22, or by connecting the beam body 22 and the protecting member 24 by a ball-and-socket joint 325, which is a universal joint as is shown in FIG. 33.

The above and other objects, features and advantages of the present invention will become clear from the following description of the preferred embodiments thereof, taken in conjunction with the accompanying drawings.

BRIEF DESCRIPTION OF THE DRAWINGS

FIGS. 36(a) to 36(e) illustrate the state in which a horizontal bending moment M is applied to the axle beam, wherein:

FIGS. 36(a) to 36(c) are plan views of the axle beam according to the second aspect of the present invention, shown in FIGS. 12 and 13; and FIGS. 36(d) and 36(e) are plan views of the first embodiment of an axle beam according to the fourth aspect of the present invention;

DESCRIPTION OF THE PREFERRED EMBODIMENTS

Embodiments of the first aspect of the present invention will now be explained with reference to the accompanying drawings.

Figure 3:
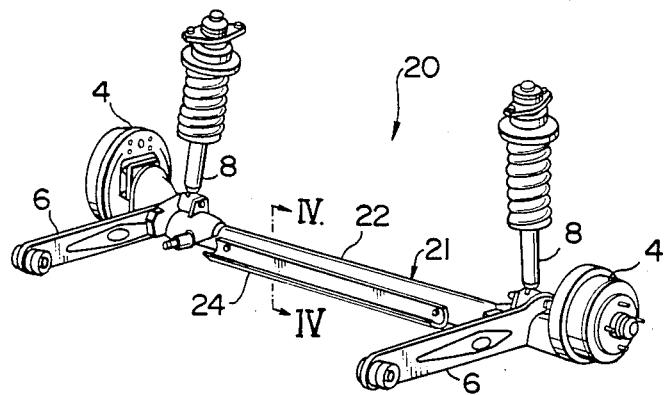
FIG. 3 is a perspective view of an embodiment of the first aspect of the present invention applied to the rear wheel suspension of an F.F. vehicle.
Figure 4:
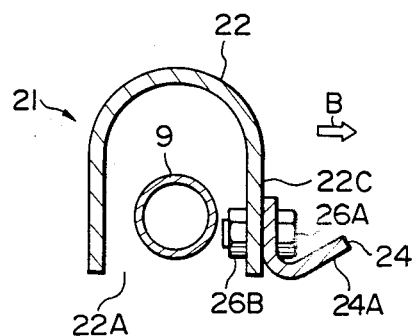
FIG. 4 is a sectional view through the embodiment shown in FIG. 3, taken along the line IV—IV.

FIGS. 3 and 4 show a first embodiment of the first aspect of the present invention, wherein FIG. 3 is a perspective view of the rear wheel suspension of an F.F. vehicle to which the axle beam according to the first aspect of the present invention is applied, and FIG. 4 is a section through the suspension of FIG. 3, taken along the line IV—IV.

The rear wheel suspension is, as is shown in FIG. 3, which is composed of the axle beam 21 having brake drums 4 at both ends thereof and which extends in the transverse direction of the vehicle, a pair of trailing arms 6 with one end of each thereof attached to the beam 21 and the other end thereof extending forward and attached to the vehicle body (not shown), and a pair of shock absorbers 8 provided with coiled springs, one end of each shock absorber being attached to the beam 21 and the other end thereof to the vehicle body.

The axle beam 21 is, as is shown in FIGS. 3 and 4, composed of the beam body 22 and the protecting member 24 which is attached to the front side of the beam body 22. The beam body 22 is formed so as to have a U-shaped cross section, and is disposed with the opening portion 22A thereof facing downward such as to prevent water, dust, or the like from settling therewithin. The protecting member 24 has a substantially V-shaped cross section and is attached to the front side wall 22C in the transverse direction of the vehicle, with both end portions in the longitudinal direction thereof bolted by bolts 26A and nuts 26B. The outer peripheral surface on the front side of the protecting member 24 is inclined upward from the bottom of the side wall 22C. The reference numeral 9 denotes a stabilizer for reducing rolling of the vehicle body and increasing running stability, and the reference symbol B indicates the direction in which the vehicle runs.

The operation of the axle beam according to this embodiment will be explained in the following with reference to FIGS. 5(a) to 5(c).

Figure 1:
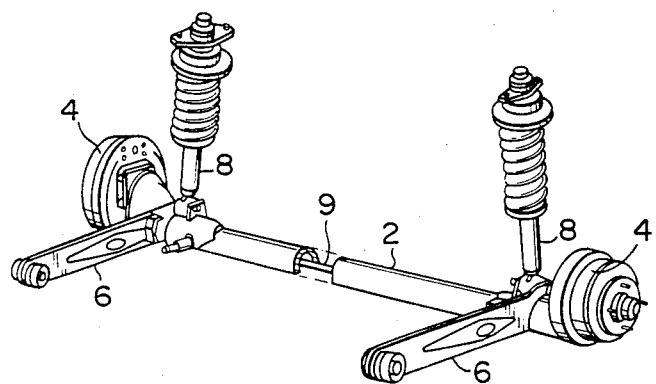
FIG. 1 is a perspective view of a conventional rear wheel suspension in a front-engine front-wheel drive vehicle (hereinunder referred to simply as "F.F. vehicle")
Figure 2:
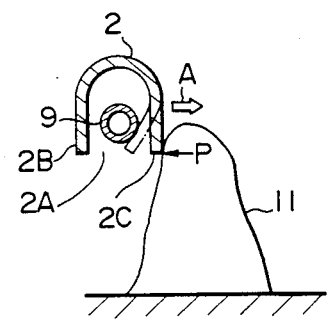
FIG. 2 is a sectional view through the conventional axle beam illustrating the state in which such has come into contact with an obstacle.
Figure 5A:
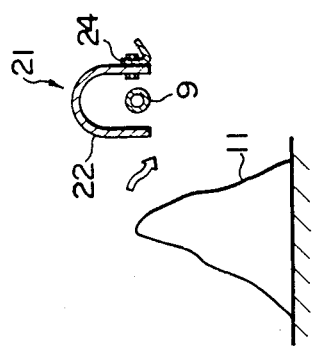
FIGS. 5(a), 5(b) and 5(c) are explanatory views of the operation of the first embodiment of the first aspect of the present invention.
Figure 5B:
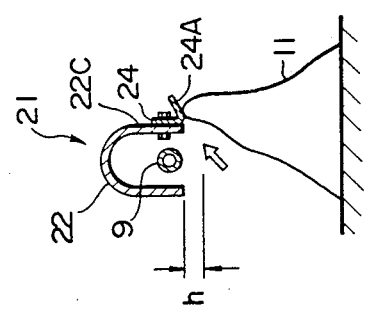
Figure 5C:
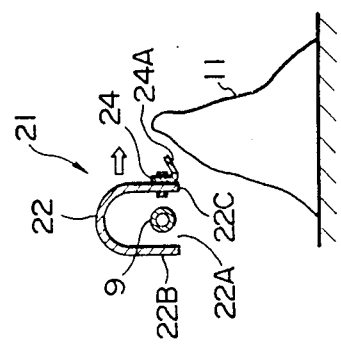

When the axle beam 21 comes into contact with the obstacle 11 which protrudes some distance from the road surface, as is shown in FIG. 5(a), the inclined outer peripheral surface 24A of the protecting member 24 touches the obstacle 11 first. The axle beam 21 then slides over the inclined outer peripheral surface of the obstacle like a skid utilizing the inclined outer peripheral surface 24A of the protecting member 24 as a sliding surface, and clears the obstacle 11, as is shown in FIGS. 5(b) and 5(c). Since the axle beam 21 can prevent a head-on collision with the obstacle 11 by sliding over the obstacle 11 like a skid as described above, no large horizontal collisional force such as that indicated by the reference symbol P in FIG. 2 is applied to the side wall 22C of the beam body, so that deformation of the axle beam 21 is prevented. Furthermore, since the large horizontal collisional force P is not applied to the axle beam 21, the passengers are not subjected to a large shock.

The axle beam 21 is pushed upward by the obstacle 11 when it passes over the obstacle 11 in contact therewith. If the amount by which the axle beam 21 is pushed upward is small (FIG. 5(b)), the amount h is absorbed by the shock absorbers 8 having coiled springs which are provided at both end portions of the axle beam 21, so that the vertical impact force produced when the axle beam 21 comes into contact with the obstacle 11 is not transmitted to the vehicle body. If the amount h by which the axle beam 21 is pushed upward is so large that the shock absorbers 8 having coiled springs cannot absorb the total amount h, the vehicle body is pushed upward as well. However, the action of the shock absorbers 8 having coiled springs alleviates the vertical impact force due to the contact between the axle beam 21 and the obstacle 11 before the impact force is transmitted to the vehicle body, thereby reducing the impact force transmitted to the passengers.

Figure 6:
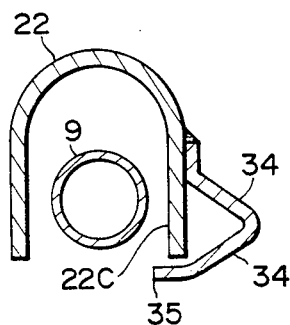
FIG. 6 is a cross sectional view through the main part of a second embodiment of the first aspect of the present invention.

FIG. 6 shows a second embodiment of the first aspect of the present invention.

Both end portions in the longitudinal direction of a protecting member 34 are welded to the front side wall 22C of the beam body 22 in the transverse direction of the vehicle. The protecting member 34 has a projecting portion which is bent so that it has a dog-legged cross section and an inclined outer peripheral surface 34A which extends below the side wall 22C. A lower side edge portion 35 of the protecting member 34 is folded in such a manner that it extends under the side wall 22C.

This embodiment, in which the protecting member 34 which serves as a skid also extends under the front side wall 22C of the beam body, ensures the sliding operation of the axle beam over the obstacle. In other words, the second embodiment of the first aspect is more effective in preventing deformation of the axle beam than the first embodiment.

Figure 7:
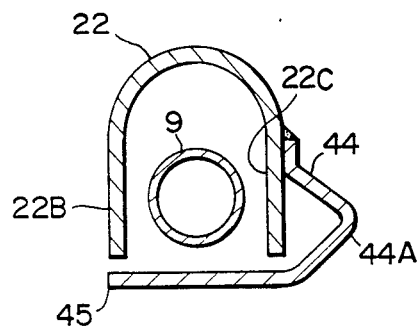
FIG. 7 is a cross sectional view through the main part of a third embodiment of the first aspect of the present invention.

FIG. 7 shows a third embodiment of the first aspect. A protecting member 44 attached to the beam body 22 has an inclined outer peripheral surface 44A which is formed by bending the protecting member so that it has a dog-legged cross section, in the same way as in the second embodiment (FIG. 6). A lower side edge portion 45 of the protecting member 44 extends under the rear side wall 22B of the beam body 22.

In this way, since the protecting member 44 serving as a skid extends under the rear side wall 22B, the axle beam can slide over the obstacle even when the running speed of the vehicle is very low.

Therefore the third embodiment is more effective in preventing deformation of the axle beam than the second embodiment (FIG. 6).

Figure 8:
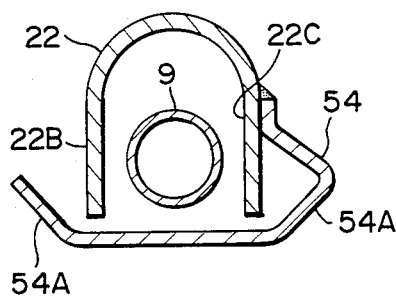
FIG. 8 a cross sectional view through the main part of a fourth embodiment of the aspect of the present invention.

FIG. 8 shows a fourth embodiment of the first aspect of the present invention. A protecting member 54 is curved around the lower portion of the beam body 22 so that it projects toward the rear side beyond the rear side wall 22B and then curves upward, whereby an inclined outer peripheral surface 54A inclining below the beam body 22 is formed on both the front and rear sides of the beam body 22. According to the fourth embodiment, the protecting member 54 serves as a skid during both forward running and reverse running of the vehicle, thereby safely preventing any deformation of the axle beam.

Figure 9:
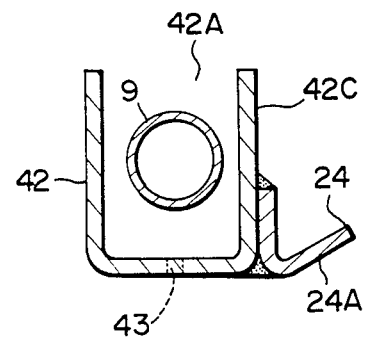
FIGS. 9 to 11 are cross sectional views through the main parts of other embodiments of the first aspect of the present invention.

In the embodiment shown in FIG. 9, a beam body 42 of a U-shaped cross section is disposed with an opening portion 42A thereof facing upward, and the protecting member 24, which has a configuration similar to that of the protecting member 24 of the first embodiment (See FIGS. 3 and 4), is welded to the lower end portion of a front side wall 42C. The reference numeral 43 denotes an outlet for draining water, dust or the like within the beam body 42.

Figure 10:
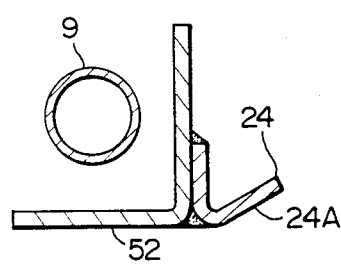
Figure 11:
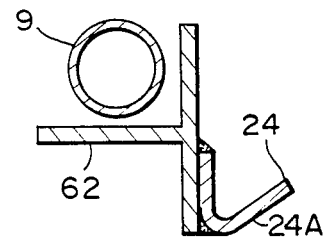

FIGS. 10 and 11 show other embodiments in which the protecting member 24 is attached to a front side wall 52C of a beam body 52 which has an L-shaped cross section, and to a front side wall 62C of a beam body 62 which has a T-shaped cross section, respectively.

As described above, the cross section of a beam body is not restricted to the U-shaped section shown in the first to fourth embodiments, and may be any configuration which is appropriate to maintain torsional rigidity. (See FIGS. 9 to 11.)

Embodiments of the second aspect of the present invention will next be described with reference to the drawings.

Figure 12:
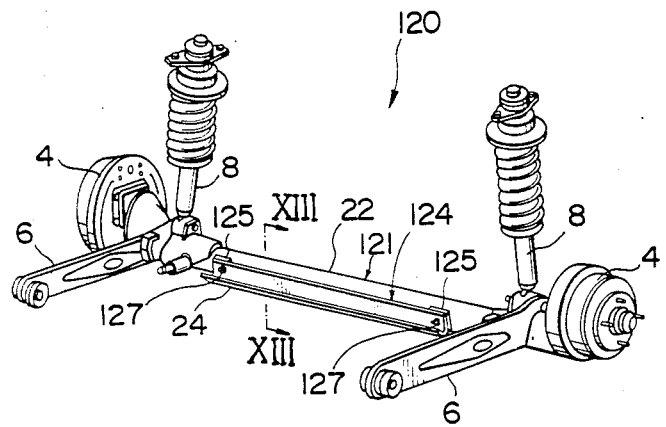
FIG. 12 is a perspective view of an embodiment of the second aspect of the present invention applied to the rear wheel suspension of an F.F. vehicle.
Figure 13:
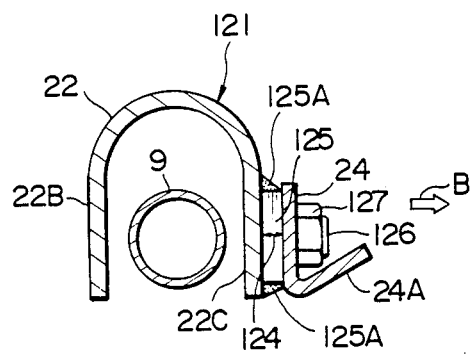
FIG. 13 is a sectional view through the embodiment shown in FIG. 12, taken along the line XII—XII.

FIGS. 12 and 13 denotes a first embodiment of the second aspect of the invention, wherein FIG. 12 is a perspective view of the rear wheel suspension of an F.F. vehicle to which the structure of the axle beam according to the second aspect of the present invention is applied, and FIG. 13 is a section through the suspension shown in FIG. 12 taken along the line XIII—XIII.

Since a rear wheel suspension 120 has a similar structure to the rear wheel suspension 20 of the first embodiment of the first aspect (See FIG. 3), only the portion (axle beam 121) thereof which is different will be explained, the explanation of the other portions being omitted, and like the reference numerals being provided for like elements. The axle beam 121 is, as is shown in FIG. 13, composed of the beam body 22 which has a U-shaped cross section with an opening portion facing downward and a protecting member 24 which has a V-shaped cross section and is attached to the front side wall 22C of the beam body 22.

Each end portion of the protecting member 24 in the longitudinal direction is secured to the front side wall 22C of the beam body 22 through a spacer 125, and the inclined outer peripheral surface 24A on the front side is inclined upward from the bottom of the front side wall 22C. The protecting member 24 is disposed a distance equivalent to the thickness of the spacer 125 from the side wall 22C. In other words, a gap 124 is formed between the front side wall 22C of the beam body 22 and the protecting member 24.

The reference numeral 125A in FIG. 13 denotes a weld bead. The spacer 125 is provided with a bolt 126 protruding therefrom, and is welded to the side wall 22C of the beam body 22, then the protecting member 24 with bolt holes (not shown) formed therein is placed on the spacers 125 so that the bolt holes are aligned with the bolts 126, and is secured to the beam body 22 by tightening nuts 127. The means for securing the beam body 22 to the spacers 125 and the protecting member 24 is not restricted to this since; welding, an adhesive or other fastening means may be adopted. Each spacer 125 is formed separately from the beam body 22 in this embodiment, but protruding portions corresponding to the spacers 125 may be formed integrally with the beam body 22. The reference symbol B denotes the direction in which the vehicle runs.

Since the operation of the axle beam according to this embodiment is the same as that of the first embodiment of the first aspect, which has already been explained with reference to FIGS. 5(a) to 5(c), it will only be simply described with reference to FIGS. 14(a) to 14(c).

Figure 14:
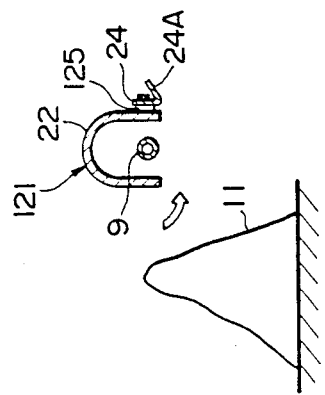
FIGS. 14(a) to 14(c) are explanatory views of the operation of the first embodiment of the second aspect of the present invention.
Figure 14:
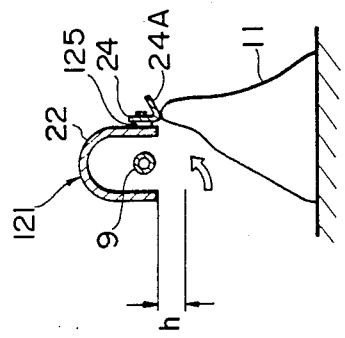
Figure 14:
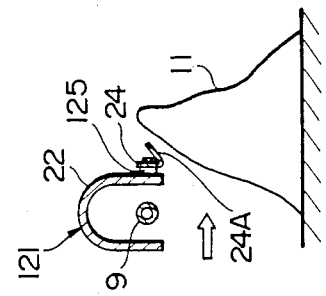

When the axle beam 121 comes into contact with the obstacle protruding from the road surface, as is shown in FIG. 14(a), the inclined outer peripheral surface 24A of the protecting member 24 first touches the obstacle 11. The axle beam 121 then slides over the outer peripheral surface of he obstacle like a skid utilizing the inclined outer peripheral surface 24 of the protecting member 24 as a sliding surface, and clears the obstacle 11, as is shown in FIGS. 14(b) and 14(c).

The protecting member 24 is disposed at a predetermined distance (equal to the thickness of the spacers 125) from the beam body 22, and only both end portions of the protecting member 24 are secured to the beam body 22 through the spacers 125. As a result, the increase in torsional rigidity of the axle beam 121 is slight, and does not have any detrimental effect either on the stability during rolling of the vehicle nor on its road holding ability during running on a rough road.

Figure 15:
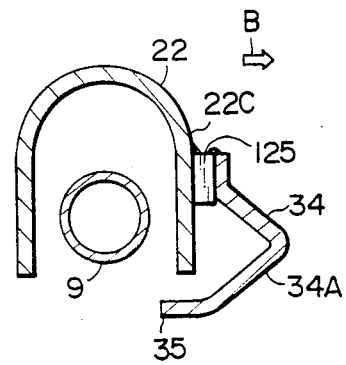
FIG. 15 is a cross sectional view through the main part of a second embodiment of the second aspect of the present invention.

FIG. 15 shows a second embodiment of the second aspect of the present invention.

The protecting member 34 is attached to the front side wall 22C of the beam body 22 through the spacer 125 in the transverse direction of the vehicle by welding both end portions in the longitudinal direction to the side wall 22C. The protecting member 34 has a projecting portion which is bent so as to have a dog-legged cross section and an inclined outer peripheral surface 34A which extends under the side wall 22C. The lower side end portion 35 of the protecting member 34 is folded so that it extends under the front side wall 22C. The reference symbol B denotes the direction in which the vehicle runs.

Since the protecting member 34 which serves as a skid extends under the front side wall 22C of the beam body in the second embodiment, the axle beam can slide over an obstacle safely. Therefore, this embodiment is more effective in preventing deformation of the axle beam in comparison with the first embodiment (See FIG. 13).

Figure 16:
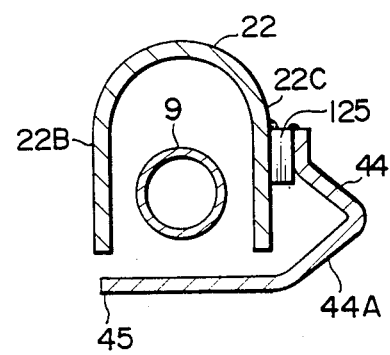
FIG. 16 is a cross sectional view through the main part of a third embodiment of the second aspect of the present invention.

Referring to FIG. 16, which shows a third embodiment of the second aspect, this embodiment is different from the second one (See FIG. 15) only in the configuration of the protecting member 44 which is to be attached to the beam body 22. The protecting member 44 has a projecting portion which is bent so as to have a dog-legged cross section in the same way as the second embodiment, and the lower side edge portion 45 passes under the beam body 22 and is located below the rear side wall 22B.

In this way, since the protecting member 34 of the third embodiment, which serves as a skid extends under the rear side wall 22B of the beam body, the axle beam can safely slide over an obstacle. Thus, the third embodiment can prevent deformation of the axle beam more effectively than the second embodiment (See FIG. 15).

Figure 17:
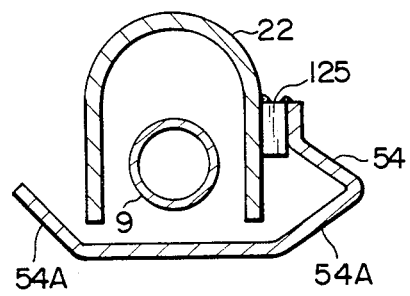
FIG. 17 is a cross section through the main part of a fourth embodiment of the second aspect of the present invention.

FIG. 17 shows a fourth embodiment of the second aspect. The protecting member 54 is curved around the lower portion of the beam body 22 so that it projects toward the rear side beyond the rear side wall 22B and then curves upward, thereby forming an outer peripheral surface 54A inclining below the beam body 22 on the rear side of the beam body 22 as well as on the front side.

This fourth embodiment can prevent deformation of the axle beam during reverse motion as well as forward motion.

Figure 18:
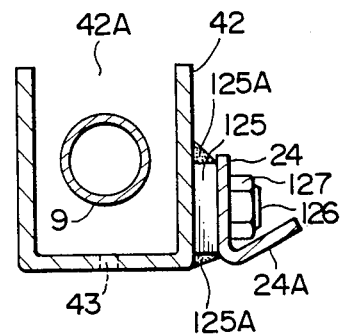
FIGS. 18 to 20 are cross sections through the main parts of other embodiments of the second aspect of the present invention.
Figure 19:
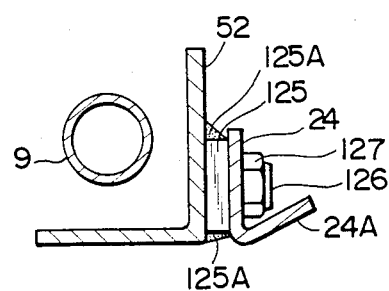
Figure 20:
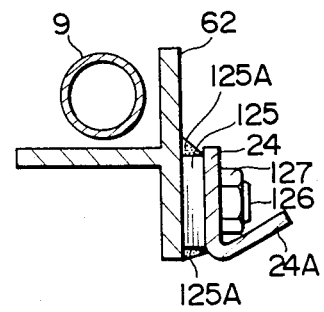

FIGS. 18 to 20 illustrate still other embodiments of the second aspect of the present invention.

In the embodiment shown in FIG. 18, the beam body 42 is formed so as to have a U-shaped cross section and is disposed with the opening portion 42A facing upward. The reference numeral 43 denotes an outlet for draining water, dust, etc. FIG. 19 shows an embodiment in which a beam body 52 has an L-shaped cross section, and FIG. 20 an embodiment in which a beam body 62 has a T-shaped cross section.

Embodiments of the third aspect of the present invention will next be explained with reference to the drawings.

Figure 21:
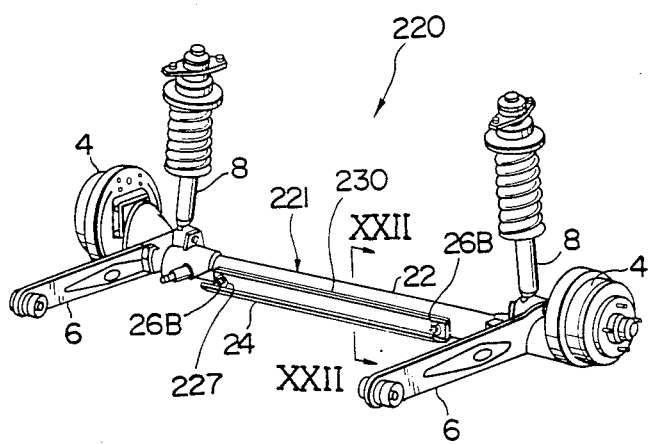
FIG. 21 is a perspective view of an embodiment of the third aspect of the present invention applied to the rear wheel suspension of an F.F. vehicle.
Figure 22:
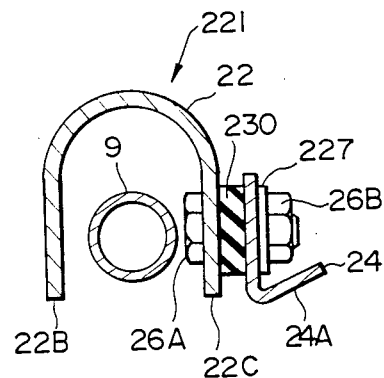
FIG. 22 is a section through the embodiment shown in FIG. 21, taken along the line XXII—XXII.

FIGS. 21 and 22 illustrate a first embodiment of the third aspect, wherein FIG. 21 is a perspective view of the rear wheel suspension of an F. F. vehicle to which the axle beam structure according to the third aspect of the present invention is fitted and FIG. 22 is a section through the suspension shown in FIG. 21 taken along the line XXII—XXII.

Since a rear wheel suspension 220 has a similar structure as the rear suspension 20 of the first embodiment of the first aspect (FIG. 3), only the portion (axle beam 121) thereof which is different will be explained, the explanation of the other portions being omitted, and the same reference numerals as in FIG. 3 will be provided for the same elements.

The axle beam 221 is, as is shown in FIGS. 21 and 22, composed of the beam body 22 which has a U-shaped cross section and an opening portion facing downward and a protecting member 24 having a V-shaped cross section which serves as a skid and which is attached to the front side wall 22C of the beam body 22.

The axle beam 221 is, as is shown in FIGS. 21 and 22, composed of the beam body 22 which has a U-shaped cross section and is disposed with the opening portion facing downward, and the protecting member 24 which is attached to the front side wall 22C of the beam body 22. The protecting member 24 is bent so as to have a V-shaped cross section, thereby forming the inclined outer peripheral surface 24A which permits the axle beam to slide like a skid.

Both end portions in the longitudinal direction of the protecting member 24 are secured to the side wall 22C by the bolts 26A and the nuts 26B, and an elastic member 230 such as rubber is inserted between the side wall 22C and the protecting member 24 extending over the entire length of the protecting member 24. The reference numeral 227 represents a retainer beneath the nut 26B.

The elastic member 230 which is inserted between the side wall 22C and the protecting member 24 permits a certain degree of relative displacement or independent movement between the beam body 22 and the protecting member 24, whereby the increase in torsional rigidity caused by the attachment of the protecting member 24 is held down.

Since the operation of the axle beam according to the embodiment is the same as that of the embodiments of the first and second aspects which has already been described with reference to FIGS. 5(a) to 5(c) and FIGS. 14(a) to 14(c), the explanation will be omitted.

As described above, this embodiment prevents deformation of the axle beam 221 by virtue of the protecting member 24 and minimizes the detrimental effect of the attached protecting member 24 on the stability during the rolling of the vehicle and the road holding ability when running on a rough road.

Figure 23:
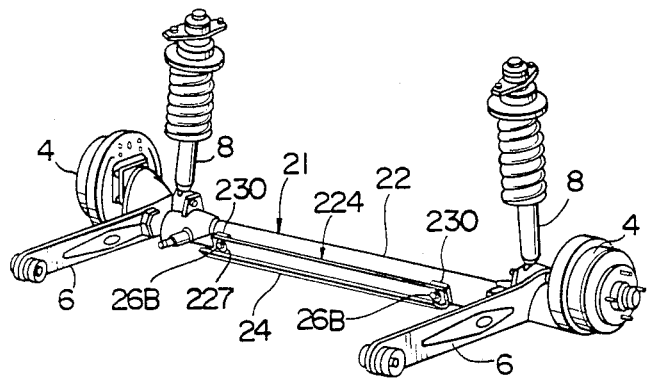
FIG. 23 is a perspective view of a second embodiment of the third aspect of the present invention.

A second embodiment of the third aspect is shown in FIG. 23. Although the elastic member 230 extends over the entire length of the protecting member 24 in the first embodiment (See FIGS. 21 and 22), the elastic members 230 in the second embodiment are provided solely in the portions where the protecting member 24 is fixed by the bolts 26A and the nuts 26B, and a gap 224 corresponding to the thickness of the elastic member 230 is formed between the front side wall 22C and the protecting member 24. Other portions have the same structure as the first embodiment, its explanation being omitted and like numbers being provided for like elements.

As described above, since the protecting member 24 is attached to the front side wall 22C through the elastic members 230 which are provided only at both end portions of the protecting member 24 in the second embodiment, the increase in torsional rigidity is kept to a minimum, and the detrimental effect on the stability during the rolling of the vehicle and on the road holding ability when running on a rough road is further reduced.

Figure 24:
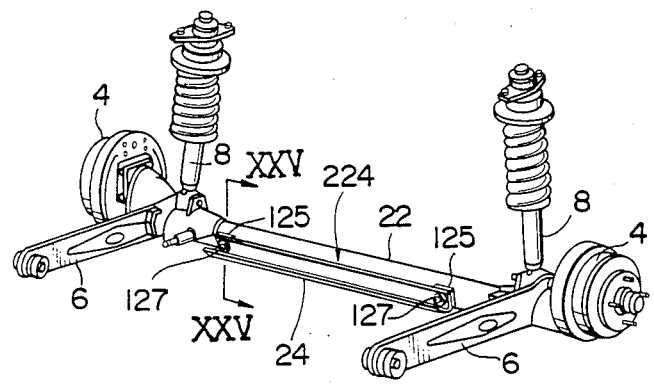
FIG. 24 is a perspective view of a third embodiment of the third aspect of the present invention.
Figure 25:
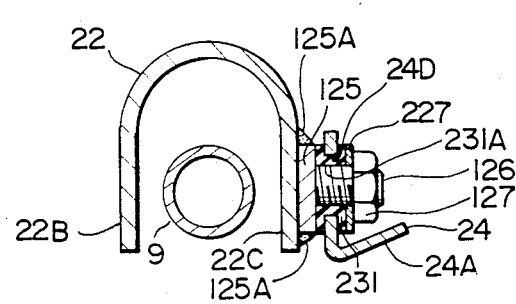
FIG. 25 is section through the embodiment shown in FIG. 24, taken along the line XXV—XXV.

FIGS. 24 and 25 show a third embodiment of the third aspect, wherein FIG. 24 shows the whole structure of the axle beam and FIG. 25 is a section through the axle beam shown in FIG. 24, taken along the line XXV—XXV. Referring to these drawings, the protecting member 24 is attached to the front side wall 22C of the beam body 22 through the spacers 125 and rubber pads 231, and the gap 224 corresponding to the thickness of the spacer 125 is formed between the side wall 22C and the protecting member 24. Each spacer 125 is provided with a bolt 126 protruding therefrom, and a retainer 227 is threaded over each bolt 126. Bolt holes 24D are formed on the protecting member 24, and a rubber pad 231 with a bolt hole 231A formed thereon is mounted on each bolt hole 24D. When the protecting member 24 is attached to the beam body 22, the spacers 125 with the protruding bolts 126 are first welded to the front side wall 22C of the beam body 22, and the protecting member 24 is mounted on the spacers 125 by inserting the bolts 126 into the bolt holes 231A of the rubber pads 231. The retainers 227 are disposed under the nuts 127 and the protecting member 24 is secured to the beam body 22 as one unit by tightening the nuts 127. The reference numeral 125A in FIG. 25 denotes a weld bead portion. Protecting member 24 is thus independently movably connected to beam body 22 due to the elastic characteristic of the rubber pads 231.

In the third embodiment, the rubber pad 231 also reduces the increase in torsional rigidity.

Figure 26:
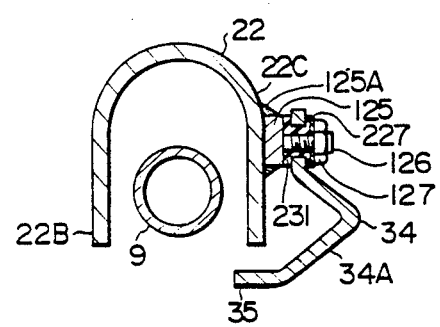
FIG. 26 is a cross section through the main part of a fourth embodiment of the third aspect of the present invention.

FIG. 26 shows a fourth embodiment of the third aspect. The projecting portion of the protecting member 34 is bent so as to have a dog-legged cross section and an inclined outer peripheral surface which extends below the side wall 22C, and the lower side edge portion 35 is curved around the lower portion the front side wall 22C.

According to the fourth embodiment, the protecting member 34, which serves as a skid, extends under the front side wall 22C of the beam body, thus ensuring the sliding operation of the axle beam over the obstacle. Accordingly, this embodiment is more effective in preventing deformation of the axle beam than the first embodiment.

Figure 27:
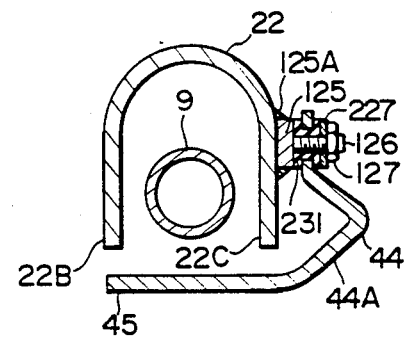
FIG. 27 is a cross section through the main part of a fifth embodiment of the third aspect of the present invention.

A fifth embodiment of the third aspect is shown in FIG. 27. The protecting member 44 which is attached to the beam body 22 is bent so as to have a dog-legged cross section and an inclined outer peripheral surface 44A as in the fourth embodiment (See FIG. 26), and the lower side edge portion 45 which is curved around the under side of the beam body 22 extends under the rear side wall 22B of the beam body 22.

In this manner, the fifth embodiment enables the axle beam to slide over an obstacle safely even when the speed of the vehicle is very low, because the protecting member 44 which serves as a skid and is attached to the rear side wall 22B of the beam body extends under the rear side wall 22B.

The fifth embodiment is thus more effective in preventing deformation of the axle beam than the second embodiment (See FIG. 26).

Figure 28:
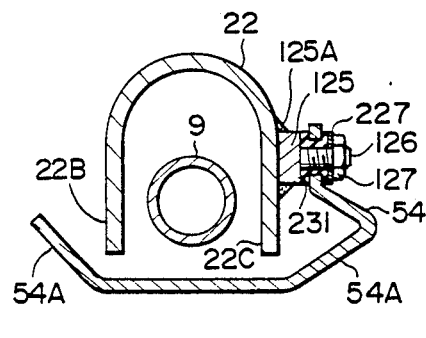
FIG. 28 is a cross section through the main part of a sixth embodiment of the third aspect of the present invention.

FIG. 28 shows a sixth embodiment of the third aspect. The protecting member 54 is curved around the under side of the beam body 22 and projects to the rear side beyond the rear side wall 22B, and the forward end portion thereof is turned upward. In this way, the outer peripheral surface 54A inclining below the beam body 22 is formed on both front and rear sides of the beam body 22. According to the sixth embodiment, the protecting member 54 serves as a skid during both forward and reverse motion, so that no deformation of the axle beam is possible.

Figure 29:
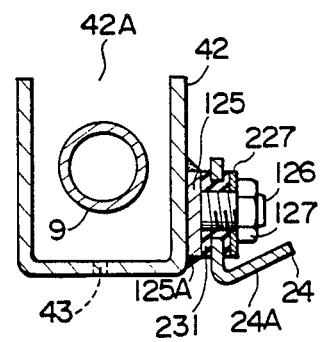
FIGS. 29 to 31 are cross sections through the main parts of other embodiments of the third aspect of the present invention.
Figure 30:
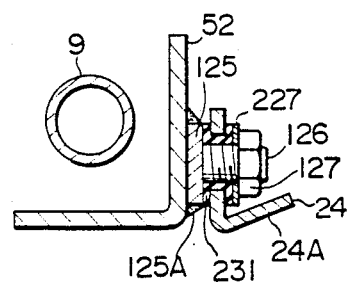
Figure 31:
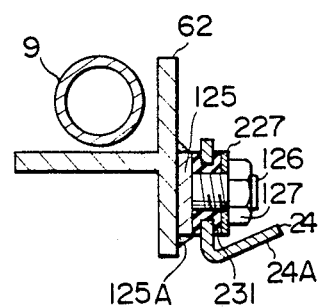
Figure 42:
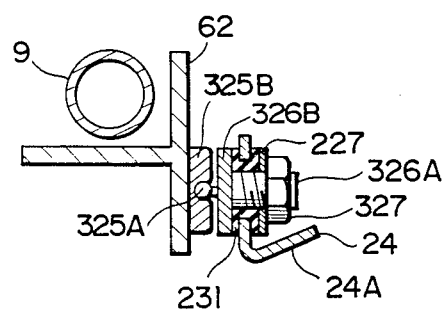

Referring now to FIGS. 29 to 31 which show still other embodiments of the third aspect, the beam body 42 in FIG. 42 is formed so as to have a U-shaped cross section and is disposed with the opening portion 42A facing downward. The reference numeral 43 denotes an outlet for draining water, dust, etc. in the beam body 42. FIG. 30 shows an embodiment in which the cross section of the beam body 52 is formed into an L-shape, and FIG. 31 an embodiment in which the cross section of the beam body 62 is formed into a T-shape.

Embodiments of the fourth aspect of the present invention will next be explained with reference to the drawings.

Figure 32:
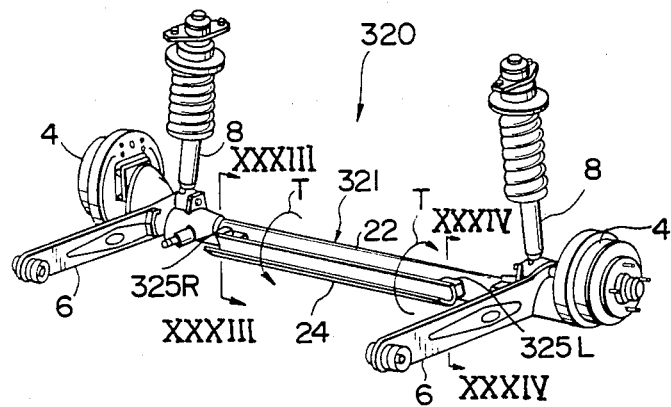
FIG. 32 is a perspective view of an embodiment of the fourth aspect of the present invention applied to the rear wheel suspension of an F.F. vehicle.

FIG. 32 is a perspective view of a rear wheel suspension of an F. F. vehicle to which the axle beam structure according to the fourth aspect of the present invention is applied and FIG. 33 is a section through the suspension shown in FIG. 32 taken along the line XXXIII—XXXIII.

Since a rear wheel suspension 320 to which the fourth embodiment is applied has a similar structure to the rear suspension 20 of the first embodiment of the first aspect (FIG. 3), only the portion (i.e. axle beam 321) thereof which is different will be explained, the explanation of the other portions being omitted, and the same reference numerals as in FIG. 3 will be provided for the same elements.

Figure 33:
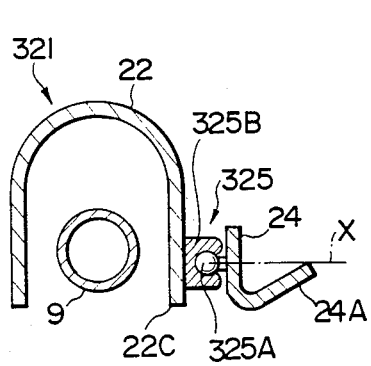
FIG. 33 is a section through the embodiment shown in FIG. 32, taken along the line XXXIII—XXXIII.

The axle beam 321 is, as is shown in FIG. 33, composed of the beam body 22 which has a U-shaped cross section and is disposed with the opening portion facing downward, and the protecting member 24 attached to the front side wall 22C of the beam body 22. The protecting member 24 is bent so as to have a V-shaped cross section, thereby forming the inclined outer peripheral surface 24A which permits the axle beam to slide like a skid.

Figure 34:
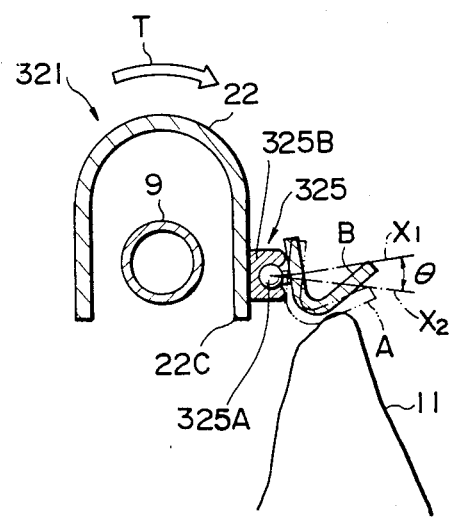
FIG. 34 is a section through the embodiment shown in FIG. 32, illustrating the rotation range of the protecting member thereof.

Both longitudinal end portions of the protecting member 24 are attached to the front side wall 22C through the ball-and-socket joints 325. Each ball joint 325 is composed of a ball portion 325A which is welded to the protecting member 24 and a ball bearing portion 325B which is welded to the front side wall 22C of the beam body. The yaw angle of the ball-and-socket joint 325 is set at $\theta$, as is shown in FIG. 34, and the ball-and-socket joint is so arranged as to allow relative swinging between the beam body 22 and the protecting member 24 in the region indicated by the reference symbols A and B within the range of the yaw angle without producing any internal stress. The reference symbols $X$, $X_1$ and $X_2$ in FIG. 34 denote the axis positions of the ball-and-socket joint 325.

The operation of the axle beam structure according to the invention will next be described with reference to FIG. 34.

As is shown in FIG. 34, the vehicle runs toward the right and the axle beam 321 comes into contact with the obstacle 11 which protrudes some distance from the road surface. The protecting member 24 is then pushed by the obstacle 11 to the position indicated by the reference symbol A in FIG. 34, in which state the axle beam 321 slides over the outer surface of the obstacle 11 like a skid, utilizing the outer peripheral surface 24A of the protecting member 24 as a sliding surface. It thus can clear the obstacle 11 in the same way as described with reference to FIGS. 5(b) and 5(c) and FIGS. 14(b) and 14(c).

Since the axle beam 321 can prevent a head-on collision with the obstacle 11 by sliding over it like a skid as described above, any deformation of the axle beam 321 is prevented. Furthermore, since the large horizontal collisional force P is not applied to the axle beam 321, the passengers are not subjected to a large shock.

Figure 35:
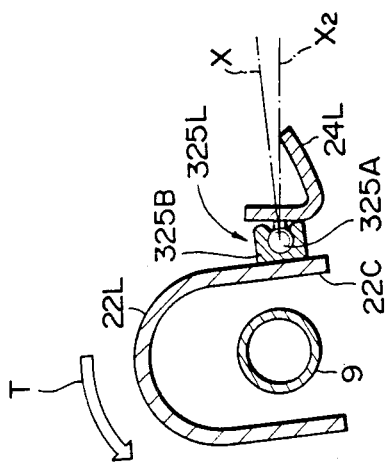
FIGS. 35(a) and 35(b) show the actions of the beam body and the protecting member when a torsional torque T is applied to the beam body.
Figure 35:
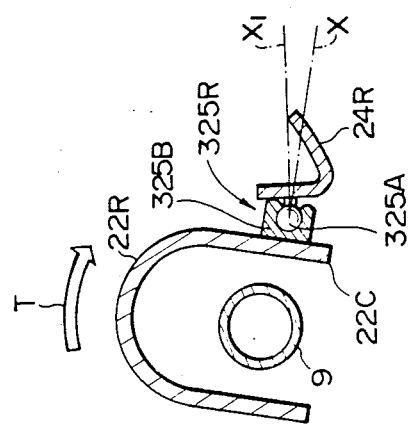

The effect of the attachment of the protecting member 24 on the torsional rigidity of the axle beam will now be considered. It is assumed that the torsional torque which is indicated by the symbol T acts on the beam body 22. FIG. 35($a$) is a cross sectional view of the right-hand portion of the beam body 22 where the protecting member 24 is attached (the left-hand portion of FIG. 32), namely the sectional view of the axle beam shown in FIG. 32 taken along the line XXXIII—XXXIII, showing the state in which the torsional torque T shown in FIG. 32 acts thereon; while FIG. 35($b$) is a cross sectional view of the left-hand portion of the beam body 22 where the protecting member 24 is attached (the right-hand portion of FIG. 32), namely the sectional view of the axle beam shown in FIG. 32 taken along the line XXXV—XXXV, showing the same situation as in FIG. 35($a$). As is clear from these drawings, when the torsional torque T acts on the beam body 22, the right end portion 22R of the beam body 22 (the left-hand portion of FIG. 32) is twisted clockwise, namely in the direction in which the torque acts, as is shown in FIG. 35($a$); while the left end portion 22L of the beam body 22 (the right-hand portion of FIG. 32) is twisted counterclockwise, namely in the direction in which the torque T acts, as is shown in FIG. 35($b$). However, since the beam body 22 and the protecting member 24 are connected through the ball-and-socket joint 325 so as to be able to swing within the range of yaw angle $\theta$, the ball portion 325A of the ball-and-socket joint 325R which connects the right end portion 22R of the beam body 22 and and the right end portion 22R of the beam body 22, rotates, as is shown in FIG. 35($a$), counterclockwise, namely in the direction opposite to the direction in which the right end portion 22R of the beam body 22 displaces (rotates), whereby the axis position X of the ball-and-socket joint 325R comes to the position $X_1$, and the right end portion 24R of the protecting member 24 is maintained in a state wherein the torsional torque does not act (See FIG. 33). On the other hand, the ball portion 325A of the ball-and-socket joint 325L which connects the left end portion 22L of the beam body 22 and and the left end portion 22L of the beam body 22, rotates, as is shown in FIG. 35(b), clockwise, namely in the direction opposite to the direction in which the left end portion 22L of the beam body 22 displaces (rotates), whereby the axis position of X of the ball-and-socket joint 325R comes to the position $X_2$, and the left end portion 24L of the protecting member 24 is also maintained in a state wherein the torsional torque does not act. In this manner, since no part of the torsional torque T which might be acting on the beam body 22 is transmitted to the protecting member 24, there is no increase in torsional rigidity caused by the attachment of the protecting member 24. Since no stress is produced in the ball-and-socket joints 325 (325R and 325L) which connect the beam body 22 and the protecting member 24, no unexpected internal stress is produced between the beam body 22, ball-and-socket joints 325 and the protecting member 24.

Figure 36:
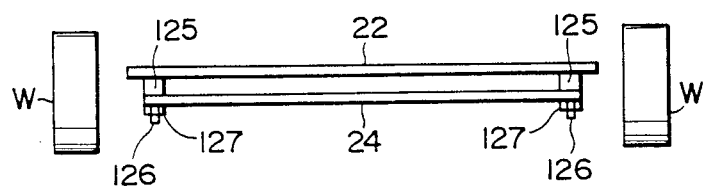
Figure 36:
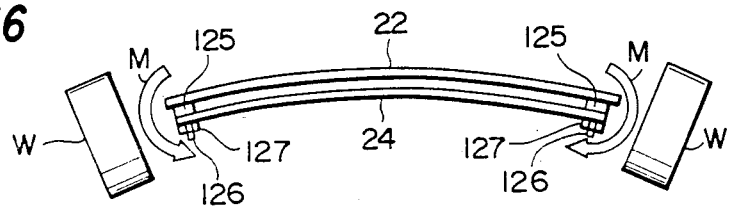
Figure 36:
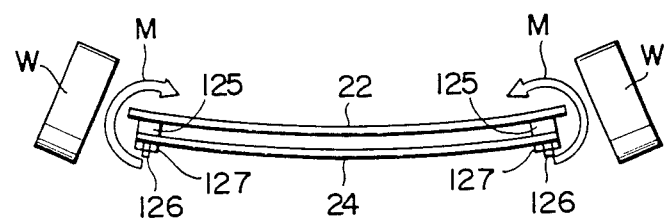
Figure 36:
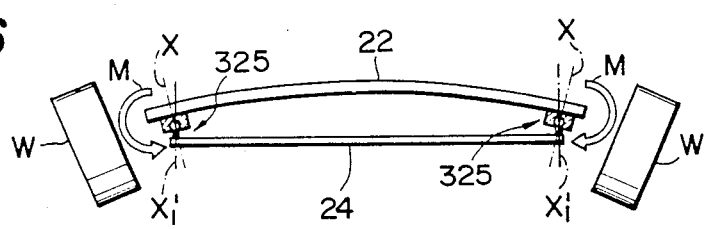
Figure 36:
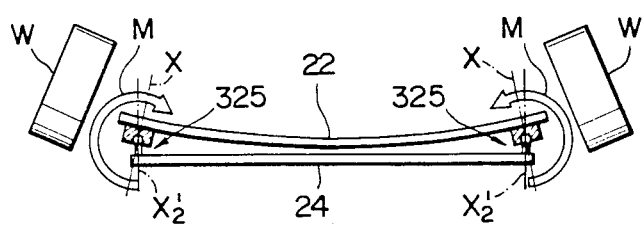

The effect of the attachment of the protecting member 24 on the flexural rigidity of the axle beam will next be considered. It is assumed that the horizontal bending moment M acts along the horizontal plane which includes the neutral axis of the beam body, as is shown in FIGS. 36(d) and 36(e).

FIGS. 36(a), 36(b) and 36(c) are plan views of the axle beam according to the second aspect of the present invention shown in FIGS. 12 and 13, and FIGS. 36(b), 36(c), 36(d), and 36(e) illustrate the state in which the horizontal bending moment M acts along the horizontal plane which includes the neutral axis of the beam body 22. The reference symbol W represents a wheel.

As is shown in FIG. 36(a), in the axle beam according to the second aspect, the beam body 22 and the protecting member 24 are joined rigidly by the bolts 126 and the nuts 127 through the spacers 125. As a result, when the bending moment M acts, the axle beam is bent, as is shown in FIGS. 36(b) and 36(c). Since its curvature is different on the concave side and the convex side, a shear stress corresponding to the difference in curvature is produced on the surfaces of the spacers 125 to which the beam body 22 is attached and the surfaces of the spacers 125 to which the protecting member 24 is attached, so that this shear stress acts on the bolts 126 which fasten the beam body 22 and the protecting member 24. While the vehicle is running, the bending moment M acts as is shown in FIGS. 36(b) and 36(c), depending upon, for example, acceleration or deceleration, whereby alternate shear stress is applied on the bolts 126.

In contrast, in this embodiment, the beam body 22 and the protecting member 24 are connected through the ball-and-socket joints 325 such as to be able to swing within the range of the yaw angle $\theta$. Therefore, even when the bending moment M is applied on the beam body 22, the ball portions 325A rotate so that the axis position X reaches positions $X_1$ and $X_2$, respectively, as is shown in FIGS. 36(d) and 36(e), whereby the protecting member 24 is maintained in the state where the bending moment M does not act. In other words, although the beam body 22 bends in accordance with the magnitude of the bending moment M, the ball portions 325A and the ball bearing portions 325B of the ball-and-socket joints 325 rotate, thereby precluding the effect of the bending moment M on the protecting member 24. As a result, such alternate shear stress as is shown in FIGS. 36(b) and 36(c) is not applied to the ball-and-socket joints 325 which connect the beam body 22 and the protecting member 24.

As described above, this embodiment has a structure which minimizes the effect of the attachment of the protecting member 24 on the torsional rigidity and the flexural rigidity of the axle beam.

Figure 37:
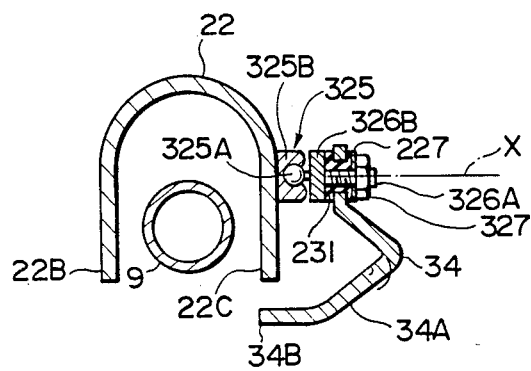
FIG. 37 is a cross section through the main part of a second embodiment of the fourth aspect of the present invention.

A second embodiment of the fourth aspect of the present invention will be shown in FIG. 37. The protecting member 34 of the embodiment is formed so as to have a projecting portion bent into a dog-legged shape with an inclined outer surface 34A, and the lower side edge portion 34B of the protecting member 34 is curved so as to extend under the front side wall 22C. The protecting member 34 is provided with welded bolt holes, into which the the rubber pads 231 having bolt holes are inserted. Bolt portions 326 of the welded bolts 326 are inserted into the bolt holes of the rubber pads 231, and the retainers 227 and nuts 327 are also placed in the bolt holes. The protecting member 34 is clamped between flange portions 326B and the retainers 227 by tightening the nuts 327, thereby being united with the welded bolts 325 into one unit. The flange portions 326B of the welded bolt 326 are welded to the ball portions 325A of the ball-and-socket joints 325; while the ball bearing portions 325B of the ball-and-socket joints 325 are welded to the front side wall 22C of the beam body 22, so that the protecting member 34 can freely swing around the axis X by the yaw angle of $\theta$. When the protecting member 34 collides with an obstacle, the protecting member 34 rotates clockwise to the position indicated by the broken line, and stops there without rotating further. Therefore, the protecting member 34 never comes into contact with the beam body 22.

As described above, the ball-and-socket joints 325 and the rubber pads 231 absorb the torsional torque T and the bending moment M in this embodiment, so the effect on the torsional rigidity and the flexural rigidity of the axle beam is smaller than in the first embodiment (See FIGS. 32 and 33). In addition, since the protecting member 34 which serves as a skid extends below the front side wall 22C, thereby ensuring the sliding of the axle beam over an obstacle, this embodiment is more effective in preventing deformation of the axle beam in comparison with the first embodiment.

Figure 38:
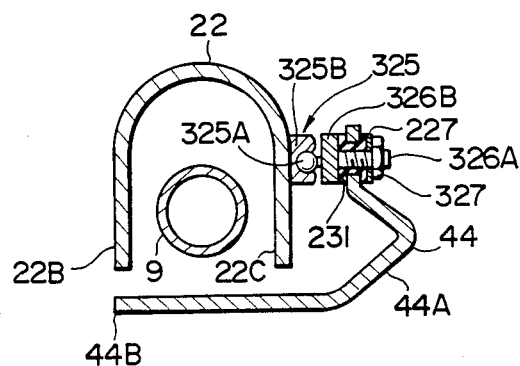
FIG. 38 is a cross section through the main part of a third embodiment of the fourth aspect of the present invention.

Referring to FIG. 38, a third embodiment of the fourth aspect is shown. The protecting member 44 which is attached to the beam body 22 is formed so as to have a dog-legged cross section as in the second embodiment (See FIG. 37), and the lower side edge portion 44B which is curved below the beam body 22 extends below the rear side wall 22B of the beam body. The reference numeral 44A denotes the inclined outer peripheral surface.

In this embodiment, the protecting member 44 which serves as a skid extends below the rear side wall 22B as described above, which structure enables the axle beam to slide safely over an obstacle even when the running speed of the vehicle is very slow.

Thus, this embodiment is more effective in preventing deformation of the axle beam than the second embodiment (See FIG. 37).

Figure 39:
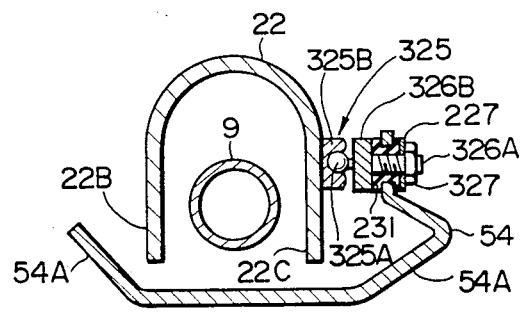
FIG. 39 is a cross section through the main part of a fourth embodiment of the fourth aspect of the present invention.

A fourth embodiment of the fourth aspect of the present invention will be shown in FIG. 39. The protecting member 54 is curved around the under side of the beam body 22 and projects to the rear side, and at the same time the forward portion is curved upward in such a manner that the inclined outer peripheral surface 54A which inclines below the beam body 22 is formed on the rear side as well. Since the protecting member 54 serves as a skid during not only forward but also reverse motion according to the embodiment, deformation of the axle beam is safely prevented.

Figure 40:
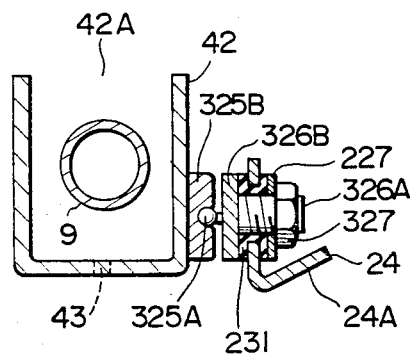
FIGS. 40 to 42 are cross sections through the main parts of other embodiments of the fourth aspect of the present invention.
Figure 41:
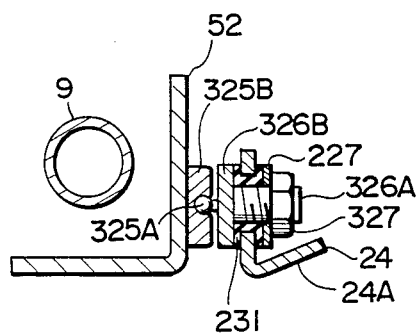

FIGS. 40 to 42 show still other embodiments of the fourth aspect. In the embodiment shown in FIG. 40, the beam body 42 is formed so that it has a U-shaped cross section and it is disposed with the opening portion 42A facing upward. The reference numeral 43 represents an inlet for draining water, dust, etc. within the beam body 42. FIG. 41 shows an embodiment in which the beam body 52 has an L-shaped cross section, and FIG. 42 an embodiment in which the beam body 62 has a T-shaped cross section.

Although the ball-and-socket joints 325 are provided on both end portions of the protecting member 24 in the embodiments (FIGS. 32 to 42) of the fourth aspect, it is also effective when the ball-and-socket joint 325 is provided on one end portion of the protecting member 24 and the other end portion is joined rigidly using a spacer such as indicated by the numeral 125 in FIGS. 12 and 13.

While there has been described what are at present considered to be preferred embodiments of the invention, it will be understood that various modifications may be made thereto, and it is intended that the appended claims cover all such modifications as fall within the true spirit and scope of the invention.

What is claimed as new and desired to be secured by letters patent of the United States is:

1. An axle beam assembly of a rear suspension of a vehicle, said assembly comprising:
    an axle beam body having an opening portion in cross-section;
    an axle beam protecting member and means for attaching said axle beam protecting member to a front side portion of said axle beam so as to be movable relatively therewith, said axle beam body protecting member having a first side connected to said axle beam body, a second side freely extending frontwardly, and having a portion whose outer peripheral surface inclined downwardly in a direction from a front side to rear side of said vehicle.

2. The structure of an axle beam of a rear suspension of a vehicle according to claim 1, wherein said axle beam body is formed so as to have an inverted U-shaped cross section.

3. The structure of an axle beam of a rear suspension of a vehicle according to claim 1, wherein said axle beam body is formed so as to have a U-shaped cross section.

4. The structure of an axle beam of a rear suspension of a vehicle according to claim 1, wherein said axle beam body is formed so as to have a T-shaped cross section.

5. The structure of an axle beam of a rear suspension of a vehicle according to claim 1, wherein an elastic member is inserted between said axle beam body and said axle beam body protecting member extending over the entire length of said axle beam body protecting member.

6. The structure of an axle beam of a rear suspension of a vehicle according to claim 1, wherein an elastic member is provided in the vicinity of both end portions in the longitudinal direction of said axle beam body protecting member.

7. The structure of an axle beam of a rear suspension of a vehicle according to claim 1, wherein said axle beam body protecting member is secured to said axle beam body in the vicinity of the longitudinal ends of said axle beam body protecting member through spacers, and an elastic member is inserted between each of said spacers and said axle beam body protecting member.

8. The structure of an axle beam of a rear suspension of a vehicle according to claim 1, wherein said axle beam body protecting member is curved around the under side of said axle beam body.

9. The structure of an axle beam of a rear suspension of a vehicle according to claim 1, wherein said axle beam body protecting member is curved around the under side of said axle beam body and projects to the rear side thereof.

10. The structure of an axle beam of a rear suspension of a vehicle according to claim 9, wherein the portion of said axle beam body protecting member which projects to the rear side of said axle beam body is curved upward so as to form an inclined outer surface.

11. An axle beam assembly as set forth in claim 1, wherein said axle beam body has a downwardly extending opening portion in cross-section.

12. An axle beam assembly is set forth in claim 1, which comprises an elastic member wherein said axle beam protecting member is attached to a front portion of said axle beam body through said elastic member.

13. An axle beam assembly of a rear suspension of a vehicle, said assembly comprising:
    an axle beam body having an opening portion in cross-section;
    an axle beam protecting member and means for attaching said axle beam protecting member to a front side portion of said axle beam so as to be movable relatively therewith, said axle beam body protecting member having a first side connected to said axle beam body and a second side which includes a first projecting section extending frontwardly and a second outer peripheral section connected to said first section and freely extending rearwardly and having a portion whose outer peripheral surface inclines downwardly in a direction from a front side to a rear side of said vehicle.

* * * * *